3,531,531
PROCESS FOR PRODUCING ACETALDEHYDE
FROM ETHYLENE
Harry B. Copelin, Niagara Falls, N.Y., assignor to E. I.
 du Pont de Nemours and Company, Wilmington, Del.,
 a corporation of Delaware
No Drawing. Filed June 23, 1965, Ser. No. 466,474
Int. Cl. C07c 45/04
U.S. Cl. 260—604                                8 Claims

ABSTRACT OF THE DISCLOSURE

The invention comprises the synthesis of acetaldehyde from ethylene employing a reaction medium of acetic acid containing a palladium salt catalyst in the presence of a zinc chloride/cupric acetate redox mixture.

---

This invention relates to a method for producing acetaldehyde from ethylene and more particularly to a method for carrying out such production in high yield with minimum formation of chlorinated by-products.

Methods have heretofore been described for the direct synthesis of acetaldehyde by reaction of ethylene with an aqueous solution of a palladium II salt and an oxidizing agent such as cupric salt, the purpose of which is to maintain the palladium salt in its +2 valence state. Such methods are described in U.S. Pats. 3,076,032, 3,080,425 and 3,122,586.

The oxidizing agent in the reaction medium becomes reduced during use and may be reoxidized for further use by means of oxygen supplied with the ethylene to the reaction medium (hereinafter generally referred to as the "working solution"), or such reoxidation or regeneration of the oxidizing agent may be effected in a separate operation.

The procedures described in the aforementioned patents tends to be deficient in certain respects, most notably in that generally poor rates are obtained unless high pressures are employed or excessively large quantities of expensive noble metal catalysts are added to the working solution. The main reason for this poor performance is the low solubility of ethylene and oxygen in aqueous solutions. A further disadvantage of the aqueous processes is the tendency to produce chlorinated products which lower yield and result in contamination of the acetaldehyde product. Previous efforts to employ nonaqueous systems, such as those based on organic acid solvents, have only tended to aggravate these problems.

It is an object of the invention to provide an improved method for producing acetaldehyde from ethylene. A further object is to obtain acetaldehyde in improved yields at commercially attractive rates. Still a further object is to produce acetaldehyde as a product which is relatively free of chlorinated contaminants. Still further objects will be apparent from the following description.

In accordance with the invention it has been found that the aforementioned deficiencies of prior art procedures for the direct synthesis of acetaldehyde from ethylene can be minimized by carrying out the reaction in an acetic acid solution using a zinc chloride/cupric acetate redox mixture providing a $Zn^{+2}/Cu^{+2}$ mol ratio within prescribed limits. More particularly, the improved process of the invention comprises effecting reaction of ethylene at an ethylene pressure of up to about 100 p.s.i.g. and at a temperature of 50 to 150° C. with a working solution comprising, in its oxidized state, acetic acid containing from 0 to 20% by weight of water, based on the solution components, a 0.001 to 0.1 molar concentration of a palladium II salt, and at least 0.5 moles of a zinc chloride/cupric acetate redox mixture, the mol ratio of $Zn^{+2}$ to $Cu^{+2}$ in said redox mixture being 0.1 to 0.6:1, and recovering the acetaldehyde so formed.

Although the process of the invention is described herein with particular reference to the production of acetaldehyde, it will be understood that vinyl acetate can also be produced as a co-product by suitable adjustment of the water content of the working solution and other process variables.

A novel feature of the process of the invention is that the reaction is carried out using acetic acid as the solvent medium. Minor proportions of water may be tolerated in the system provided, however, that the amount thereof does not become so excessive as to materially reduce the solubility of ethylene and oxygen therein or to promote the formation of chlorinated by-product contaminants. It has been found that the amount of water in the working solution should not exceed about 20% by weight. Preferably, however, the solvent of the working solution will contain no more than 40 mol percent water (the eutectic point). Where acetaldehyde is to be produced in maximum quantities the water content is advantageously 5% to 10% by weight, based on the working solution. If vinyl acetate is desired as a co-product, 0 to 5% by weight of water is desirable. Calculated as percentages based only on the water and acetic acid present, these latter ranges become 7.4 to 13% and 0 to 7.4%, respectively. Calculated as mol percentages, based on acetic acid and water, these values become 21 to 35% and 0 to 21%, respectively.

The improved method of the invention may be performed on a continuous scale or batchwise in a single-stage process, wherein synthesis and oxidation reactions are carried out simultaneously, or in a two-stage process. In the single stage process ethylene and oxygen are simultaneously fed to the reactor and working solution is drawn off continuously or intermittently for removal of acetaldehyde. Water is also formed continuously in the oxidation reaction of the single stage process and various techniques may be used to maintain it at below 20%, e.g. by partial replacement of acetic acid in the working solution with acetic anhydride or by blowing large amounts of gas through the working solution.

The two-stage process does not liberate water in the synthesis step and hence the amount of water therein will depend on the amount in the feed. Effluent from the synthesis reactor is stripped of acetaldehyde and excess water and oxidized with air prior to being returned to the synthesis reactor. The water content of the feed can be maintained at a suitably low level of 0 to 20% by weight, based on the working solution, by common drying procedures. Conventional single or two stage apparatus may be used for carrying out the process of the invention. The synthesis reaction is performed at a temperature of at least 50° C., e.g., 50 to 150° C. Lower temperature materially impair the space time yields whereas higher temperatures result in no added advantages. The preferred temperatures range from 80 to 120° C.

While it is entirely practicable to operate under atmospheric pressure, the use of moderate pressures on the order of 25–75 p.s.i.g. is beneficial. Use of pressures substantially in excess of about 100 p.s.i.g. are deleterious in that excessive amounts of vinyl acetate are formed. While some vinyl acetate is formed in all cases, it may be recycled and converted to acetaldehyde in the synthesis stage by hydrolysis in the presence of the catalyst. Similarly the by-product ethylidene diacetate can be recycled and converted to acetaldehyde. If desired, however, the vinyl acetate can be separated and isolated as a co-product of the reaction. In this case somewhat higher ethylene pressures and lower water contents may be desirable as compared to the situation in which only acetaldehyde is desired.

The oxidation of reduced copper in a two-stage process can be carried out employing oxygen gas in a purified form or, more simply, just air. In a single stage process a purified form of oxygen is preferred as otherwise the gaseous phase will be diluted with nitrogen and recycling of the ethylene gas will become unduly complex. Oxygen partial pressures of from 0.01 to 2 atmospheres or more are generally suitable and when using air, operation with the system under pressure so as to give oxygen partial pressures within the above range is desirable. Whether using oxygen gas, oxygen-enriched air, or air, the preferred oxygen partial pressures range from 0.1 to 1 atmosphere. During the oxidation reaction, agitation is desirable to keep the solids in suspension and to provide good contact between the gaseous reactant and the working solution. Reaction temperatures of at least 50° C., e.g. 50° to 150° C. and preferably 80° to 130° C., are employed.

The working solution in its oxidized state is an acetic acid solution of a palladium II salt as catalyst and a redox mixture of zinc chloride and cupric acetate. It will be understood that the term "solution" is intended to embrace all fluid reaction mixtures irrespective of whether or not the components are fully dissolved. Frequently the solution will be in the form of a slurry with a part of the acetate salt being dispersed in particulate form.

Suitable palladium II salts for use in the working solution are the chloride ($PdCl_2$), the bromide ($PdBr_2$) and the acetate ($Pd(OAc)_2$); and the alkali metal chloro- and bromopalladites, such as potassium chloropalladite ($K_2PdCl_4$) and lithium chloropalladite ($Li_2PdCl_4$). The palladium II salt, the important part of which is the Pd II portion thereof, should be soluble in the working solution in an amount to provide a dissolved palladium II salt concentration of from 0.001 to 0.1 mole, or higher, preferably 0.003 to 0.03 mole, per liter. The palladium II salt can be charged to the working solution as one of the salts indicated above; or palladium metal, its oxide or carbonate may be charged and dissolved in the working solution.

The redox system employed in the working solution consists of a mixture of zinc chloride and cupric acetate. While the molar ratio of $Zn^{+2}$ to $Cu^{+2}$ provided by these salts can vary from about 0.1 to 0.6:1, it is preferred to operate between 0.4 to 0.6:1. Lower ratios tend to reduce the reaction rate and conversion whereas higher ratios offer no added advantages. The total moles of zinc chloride and copper acetate charged to the working solution is not critical and may vary substantially. To a considerable extent the choice of concentration will depend on the type of process employed. When a single stage process is used in which ethylene and oxygen are fed simultaneously to the reactor, the total moles per liter of solution will generally be 0.5 to 1.0 to facilitate solution handling. In a multistage process where oxidation and reduction of the working solution are carried out in separate reactors, it is desirable to employ as high a concentration of zinc chloride and copper acetate as is practical to circulate since this will result in higher concentrations of acetaldehyde in the effluent from the synthesis reaction. Amounts up to about 3 moles (total) of these salts per liter of solution are practical in such a multistage process.

It is to be understood that the zinc chloride and cupric acetate need not be added as such to the working solution but rather can be added in other forms to generate the zinc, chloride, cupric, and acetate ions in the desired quantities. Thus 0.5 mole of $ZnCl_2$ and 1.0 mole of $Cu(OAc)_2$ could be used per liter of solution or 0.5 mole of $CuCl_2$, 0.5 mole $Zn(OAc)_2$ and 0.5 mole of $Cu(OAc)_2$ per liter of solution. Similarly it is possible to start with 1 mole of cuprous chloride and 0.5 mole of zinc acetate and then oxidize. Any of these mixtures would yield a $ZnCl_2$—$Cu(OAc)_2$ ratio of 0.5. Hydrochloric acid can also be used in combination with $Zn(OAc)_2$ to provide a source of $ZnCl_2$.

The invention is illustrated by the following examples. In the examples and throughout the specification, all composition percentages are by weight.

EXAMPLES 1–8

A series of tests is carried out in a 300 cc., titanium-lined pressure vessel fitted with agitator, pressure gauge, gas inlet line and facilities for indicating and controlling the temperature. In all tests the following are added:

|  | Grams | Moles | Moles/Liter |
|---|---|---|---|
| Acetic acid | 100 | | |
| $Cu(OAc)_2$ | 27 | 0.15 | 1.24 |
| $ZnCl_2$ | 12 | 0.088 | 0.73 |

After adding the desired amount of water to the above charge the autoclave is sealed and the temperature raised to 100° C. It is then pressurized with ethylene to the desired pressure and agitated for a specific length of time. The reactor is then cooled, vented, and the contents sampled and analyzed by vapor chromatography.

In Examples 1 to 4 the ethylene pressure is varied to ascertain the effect upon the proportion of acetaldehyde produced. In each of these examples 8 grams of water is added to the above charge to give 5% $H_2O$, based upon the solution weight.

| Example Number | Catalyst | Press., p.s.i.g. | Time, Min. | Mole Conversion Based Upon Cupric Salt Reduced To— | | |
|---|---|---|---|---|---|---|
| | | | | Acetaldehyde | Vyiyl Acetate | Ethylidene Diacetate |
| 1 | 0.2 g. $PdCl_2$ | 10 | 20 | 70.6 | 3.7 | 12.0 |
| 2 | 0.2 g. $PdCl_2$ | 20 | 20 | 86.5 | 9.3 | 4.0 |
| 3 | 0.2 g. $PdCl_2$ | 50 | 20 | 77.2 | 18.0 | 3.8 |
| 4 | 0.25 g. $Li_2PdCl_4$ | 200 | 5 | 51.0 | 43.5 | 4.2 |

It can be seen from the above that pressures in excess of about 100 p.s.i. are undesirable due to loss in conversion to acetaldehyde. While the vinyl acetate and ethylidene diacetate could be recycled for conversion to acetaldehyde, it will be apparent that the production rate would nevertheless be considerably reduced.

In Examples 5 to 8 a constant ethylene pressure of 50 p.s.i.g. is used but varying proportions of water are employed in the working solution above described.

| Example Number | Catalyst | Percent Water* | Time, Min. | Mole Conversion Based Upon Cupric Salt Reduced To— | | |
|---|---|---|---|---|---|---|
| | | | | Acetaldehyde | Vinyl Acetate | Ethylidene Diacetate |
| 5 | 0.2 g. $PdCl_2$ | 0 | 20 | 30.4 | 44.0 | 20.8 |
| 6 | 0.2 g. $PdCl_2$ | 2 | 20 | 52.7 | 35.3 | 9.2 |
| 3 | 0.2 g. $PdCl_2$ | 5 | 20 | 77.2 | 18.0 | 3.8 |
| 7 | 0.2 g. $PdCl_2$ | 10 | 20 | 94.2 | 3.1 | 1.8 |
| 8 | 0.2 g. $PdCl_2$ | 20 | 20 | 98.0 | 1.0 | 0.4 |

* Based on total charge.

The above tests show that at 50 p.s.i.g., 20% water is adequate to produce essentially all acetaldehyde. At lower pressures on the order of 10–20 p.s.i.g., only about 10% water is required.

The composition of the working solution in these examples and the mol ratios of acetaldehyde and vinyl acetate produced are:

| | Grams | | | | | Mole Conversion Based Upon Cupric Salt Reduced to— | |
|---|---|---|---|---|---|---|---|
| Example | $Cu(OAc)_2H_2O$ | $ZnCl_2$ | HOAc | $H_2O$ | Pd° * | Acetaldehyde | Vinay Acette |
| 11 | 30 | 6 | 100 | 13 | 0.2 | 54 | 28 |
| 12 | 30 | 8 | 100 | 13 | 0.2 | 58 | 29 |
| 13 | 30 | 10 | 100 | 13 | 0.2 | 65 | 30 |
| 14 | 30 | 12 | 100 | 13 | 0.2 | 71 | 25 |
| 15 | 30 | 14 | 100 | 13 | 0.2 | 78 | 20 |

* Added as palladium metal.

The crude, stripped reaction product from Example 5 is analyzed for total chlorine and found to be substantially free of chlorinated by-products.

EXAMPLE 9

The procedure of Example 7 is repeated exactly except that 3.22 g. (50% of that which would theoretically be produced if all vinyl acetate were produced) of vinyl acetate are added to the initial charge. Analysis of the product reveals the following:

| | AcH found, g. | VAc found, g. |
|---|---|---|
| Run Number: | | |
| 7 | 3.12 | 0.20 |
| 9 | 4.49 | 0.66 |

These results show that about 85 percent of the added vinyl acetate is converted to acetaldehyde in a single pass. Hence it is clear that in a continuous process, vinyl acetate can be recycled to the synthesis reactor for hydrolysis thereof to acetaldehyde.

EXAMPLE 10

This example illustrates the applicability of the process of the invention to a continuous cyclic process. A working solution is prepared which is identical in composition to that of Example 7. The charge is pumped continuously into a titanium-lined pressure reactor where it is contacted with ethylene at a pressure of 50 p.s.i.g. The reactor is of 80 cc. working capacity and is fitted with an agitator, an overflow line, and a temperature controller set for 100° C. The feed of working solution to the mixer and the withdrawal of the reaction mixture therefrom is maintained at fixed levels to maintain a constant volume in the vessel and a contact time of 8 minutes. After 60 minutes of operation the reactor effluent is sampled and the conversion to acetaldehyde is found to be in excess of 80%.

The effluent is stripped of acetaldehyde and water and then reoxidized with air at a temperature of 90° C. and under an oxygen partial pressure of 9 p.s.i.a. The concentration of ingredients in the reoxidized working solution is adjusted to the level of the initially prepared charge except that some vinyl acetate and ethylidene diacetate is contained therein. It is then used for recycling to the synthesis reactor.

EXAMPLES 11–15

These examples show the effect of variations in the zinc chloride-copper acetate ratio upon the conversion level and the product distribution. The conditions used are:

Temperature—100° C.
Time—5 min.
Pressure—100 p.s.i.g.
Water Content—10%

The molar concentrations of copper and zinc salts in the working solution and their ratio is as follows:

| | Moles | | Ratio | Total Moles of Salts/Liter |
|---|---|---|---|---|
| Example | $Cu(OAc)_2H_2O$ | $ZnCl_2$ | $Zn^+/Cu^+$ | M. Solution |
| 11 | 0.15 | 0.0440 | 0.293 | 1.53 |
| 12 | 0.15 | 0.0586 | 0.390 | 1.63 |
| 13 | 0.15 | 0.0732 | 0.489 | 1.74 |
| 14 | 0.15 | 0.0880 | 0.586 | 1.84 |
| 15 | 0.15 | 0.1030 | 0.688 | 1.95 |

What is claimed is:

1. Method for producing acetaldehyde from ethylene comprising effecting reaction of ethylene at an ethylene pressure of up to about 100 p.s.i.g. and at a temperature of 50 to 150° C. with a working solution comprising acetic acid containing from 0 to 20% by weight of water, based on the solution components, a 0.001 to 0.1 molar concentration of a palladium II salt, and at least 0.5 mole per liter of a zinc chloride/cupric acetate redox mixture, the mol ratio of $Zn^{+2}$ to $Cu^{+2}$ in said redox mixture in its oxidized state being 0.1 to 0.6:1, and recovering the acetaldehyde so formed.

2. Method according to claim 1 wherein said mol ratio of $Zn^{+2}$ to $Cu^{+2}$ in said redox mixture is 0.4 to 0.6:1.

3. Method according to claim 1 wherein said working solution contains 0.5 to 3 moles per liter of said zinc chloride/cupric acetate redox mixture.

4. Method according to claim 1 wherein the water content of said working solution is 5% to 10% by weight, based on the solution components.

5. Method according to claim 1 wherein the water content of said working solution is 0% to 5% by weight, based on the solution components.

6. Method according to claim 1 wherein said temperature is 80° to 120° C.

7. Method according to claim 1 wherein said ethylene pressure is 25 to 75 p.s.i.g.

8. A cyclic method for producing acetaldehyde from ethylene comprising the steps of:
   (a) effecting reaction of ethylene at an ethylene pressure of up to about 100 p.s.i.g. and at a temperature of 50 to 150° C. with a working solution comprising acetic acid containing from 0 to 20% by weight of water, based on the solution components, a 0.001 to 0.1 molar concentration of a palladium II salt, and at least 0.5 mole per liter of a zinc chloride/cupric acetate redox mixture, the mol ratio of $Zn^{+2}$ to $Cu^{+2}$ in said redox mixture in its oxidized state being 0.1 to 0.6:1, whereby said redox mixture is at least partially reduced to yield a reduced working solution and acetaldehyde is produced.

(b) recovering as product the acetaldehyde produced in step (a),
(c) reoxidizing said reduced working solution by contacting said reduced working solution with oxygen at a temperature of 50° to 150° C. and an oxygen partial pressure of 0.01 to 2 atmospheres, and
(d) recycling to step (a) the reoxidized working solution resulting from step (c).

References Cited

UNITED STATES PATENTS

| | | |
|---|---|---|
| 3,284,507 | 11/1966 | Mau. |
| 3,277,158 | 10/1966 | Schaeffer. |
| 3,131,223 | 4/1964 | Smidt et al. |
| 3,080,425 | 3/1963 | Smidt et al. |

FOREIGN PATENTS 960,195  6/1964  Great Britain.

LEON ZITVER, Primary Examiner

R. H. LILES, Assistant Examiner

U.S. Cl. X.R.

260—497